Patented Feb. 25, 1941

2,232,943

UNITED STATES PATENT OFFICE 2,232,943

MANUFACTURE OF UNSATURATED ESTERS

Herbert Gudgeon and Rowland Hill, Manchester, England, assignors to Imperial Chemical Industries Limited, a corporation of Great Britain No Drawing. Application December 21, 1939, Serial No. 310,470. In Great Britain December 14, 1938

12 Claims. (Cl. 260—434)

This invention relates to the manufacture of new compounds, namely $\alpha$-hydroxy-$\beta$-ethylidene-propionic esters and their acyl derivatives.

It is an object of this invention to prepare new chemical compounds. Another object is to prepare new intermediates which may be used to prepare polymerizable diene compounds. Other objects will appear hereinafter.

These objects have been accomplished by reacting crotonaldehyde with hydrogen cyanide to form crotonaldehydecyanohydrin, hydrolyzing the cyanohydrin, and esterifying the product of hydrolysis with an alcohol. These $\alpha$-hydroxy-$\beta$-ethylidene-propionic esters which are new compounds may be treated with an acylating agent, such as an organic acid, acid chloride, or anhydride. The resulting $\alpha$-acyl-$\beta$-ethylidene-propionic esters are also new compounds.

In order that the process may be more fully understood, the following specific examples are given. Such examples are merely by way of illustration. The invention is not limited thereto, but suitable variations may be made as will become more apparent hereinafter.

Example I

Four hundred ninety (490) parts of crotonaldehyde-cyanohydrin (made by adding 350 parts of crotonaldehyde to 135 parts of hydrogen cyanide containing 5 parts of diethylamine as catalyst) are mixed with 480 parts of methyl alcohol and heated to 60° C. About one-third of a mixture of 480 gm. of methanol, 173 parts of 35.4 per cent hydrochloric acid into which have been passed 160 parts of hydrogen chloride gas, are then added and a vigorous reaction occurs. The rest of the acid mixture is added as fast as the vigor of the reaction will allow (e. g., in about 20 minutes), and the mixture is heated at 70° C. for 8 hours. The excess acid is neutralized with alcoholic potassium hydroxide solution, the precipitated salts filtered off and the liquid distilled in vacuo. The methyl $\alpha$-hydroxy-$\beta$-ethylidene propionate, is collected at 90–94°/15 mm.

Example II

One hundred (100) parts of the product of Example I are gradually added to 86 parts of boiling acetic anhydride containing 1 part of 96 per cent sulphuric acid. The resulting product is distilled in vacuo through a fractionating column and methyl $\alpha$-acetoxy-$\beta$-ethylidene-propionate, is collected at 114–118°/20 mm.

Example III

One hundred forty six (146) parts of crotonaldehydecyanohydrin (prepared as in Example I) were run gradually into a stirred mixture of 25 parts of water and 518 parts of n-butyl alcohol, to which has been added 50 parts of hydrogen chloride gas, initially at a temperature of 80°. The temperature rises to 110° during the addition, which occupies about 20 minutes, and the mixture is then heated at 80–90° for 18 hours. After neutralization of the excess acid as in Example I, and filtering off the deposited salts, the liquid is fractionated. Butyl $\alpha$-hydroxy-$\beta$-ethylidene-propionate, b. p. 140–141°/41 mm. is obtained in very good yield.

Example IV

The product of Example III may be acetylated by the process of Example II. Butyl $\alpha$-acetoxy-$\beta$-ethylidene propionate is obtained in very good yield.

Example V

A solution of 62 parts of hydrogen chloride gas and 64 parts of 35 per cent hydrochloric acid in 150 parts of methyl alcohol is added during 20 minutes to 204 parts of crotonaldehyde cyanohydrin dissolved in 130 parts of methyl alcohol while stirring and maintaining at 60–70° C. The mixture is heated at 60–70° C. for 12 hours. The precipitated salts are then filtered off, and the solution is fractionally distilled under reduced pressure. Ethyl - $\alpha$-hydroxy-$\beta$-ethylidenepropionate (b. p. 90° C./20 mm.) is obtained in good yield.

The ester can readily be acetylated in the same way as the corresponding methyl ester (cf. Example II).

Example VI

A solution of 62 parts of hydrogen chloride gas and 64 parts of 35 per cent hydrochloric acid in 240 parts of $\beta$-ethoxy-ethyl alcohol is run during 20 minutes into a solution of 204 parts of crotonaldehydecyanohydrin in 150 parts of $\beta$-ethoxy-ethyl-alcohol while stirring, and maintaining the temperature at about 60° C. by cooling. The mixture is maintained at about 60° C. for 12 hours. The deposited salts are filtered off, and the filtrate is neutralized with alcoholic potassium hydroxide solution, and fractionally distilled in vacuo. The $\beta$-ethoxy-ethyl $\alpha$-hydroxy-$\beta$-ethylidenepropionate is collected at 104–106°/7 mm.

The ester may be acetylated in the same way as the corresponding methyl ester.

Example VII

Sixty (60) parts of glacial acetic acid, 200 parts of toluene and 2 parts of sulphuric acid are placed in a vessel which is heated to 150–155° C. After passing through a fractionating column, the issuing vapors are condensed, and after passing through a dehydrant consisting of calcium chloride granules are continuously returned to the reaction vessel. Sixty-five (65) parts of methyl α-hydroxy-β-ethylidenepropionate is added to the flask in portions of 3.25 parts at intervals of half an hour. When the addition is complete, the toluene solution is washed twice with water, dried over anhydrous magnesium sulphate, and fractionally distilled under reduced pressure. Methyl α-acetoxy-β-ethylidenepropionate is obtained in good yield.

In making the esters, the treatment with the hydrolyzing acid and the treatment with the alcohol can be effected conveniently by reacting together crotonaldehydecyanohydrin, water, the hydrolyzing acid and the alcohol, the water being used in quantity corresponding to about one molecular proportion to one molecular proportion of the cyanohydrin, and the acid in quantity in excess of that necessary to combine with the ammonia formed.

The crotonaldehyde cyanohydrin need not be isolated. It may, if desired, be prepared by interacting crotonaldehyde and hydrocyanic acid, in the presence of a suitable alkaline catalyst such as sodium cyanide, in solution in a mixture of excess of the appropriate alcohol, and water in amount equivalent to one molecular proportion of the cyanohydrin. The solution of crotanaldehydecyanohydrin so obtained may then be treated with the hydrolyzing acid to yield the α-hydroxy-β-ethylidenepropionic ester.

While the invention is not limited to any particular alcohol, alcohols of from one to four carbon atoms are preferred and methyl alcohol is especially preferred.

The acylating reaction may be carried out with an organic acid, an acid chloride, or an acid anhydride. Preferably, the acyl group contains from two to five carbon atoms and especially preferred is the acetyl group.

The α-hydroxy-β-ethylidene-propionic esters and their acyl derivatives prepared according to the present invention are new compounds. They are valuable as intermediates in the preparation of other compounds, especially polymerizable dienes.

Suitable changes may be made in the process without departing from the spirit thereof, and the scope of the invention is indicated in the appended claims.

We claim:

1. A process which comprises reacting crotonaldehyde with hydrogen cyanide, hydrolyzing the resulting crotonaldehydecyanohydrin, esterifying the product of hydrolysis with a lower aliphatic alcohol, and reacting the resulting α-hydroxy-β-ethylidene-propionic ester with a lower aliphatic acylating agent to produce an α-acyloxy-β-ethylidene-propionic ester.

2. A process which comprises reacting crotonaldehydecyanohydrin with a hydrolyzing acid and a lower aliphatic alcohol, and reacting the resulting α-hydroxy-β-ethylidine propionic ester with a lower aliphatic acylating agent to produce an α-acyloxy-β-ethylidene-propionic ester.

3. A lower aliphatic α-acyloxy-β-ethylidene-propionic ester.

4. A process which comprises reacting crotonaldehyde with hydrogen cyanide, hydrolyzing the resulting crotonaldehydecyanohydrin and reacting the product of hydrolysis with a lower aliphatic alcohol.

5. A lower aliphatic α-hydroxy-β-ethylidene-propionic ester.

6. A process which comprises hydrolyzing crotonaldehydecyanohydrin, esterifying the product of hydrolysis with an aliphatic alcohol of from one to four carbon atoms and reacting the resulting α-hydroxy-β-ethylidene-propionic ester with an acylating agent having an acyl radical of from two to five carbon atoms.

7. A compound of the formula

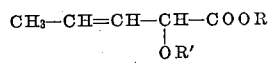

wherein R is an alkyl radical of from one to four carbon atoms and R' is a member of the group consisting of hydrogen and acyl radicals of from two to five carbon atoms.

8. A compound of the formula

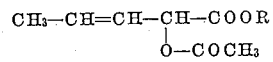

wherein R is an alkyl radical of from one to four carbon atoms.

9. A compound of the formula

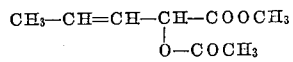

10. A process which comprises hydrolyzing crotonaldehydecyanohydrin and reacting the product of hydrolysis with an aliphatic alcohol of from one to four carbon atoms.

11. A compound of the formula

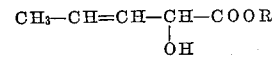

wherein R is an alkyl radical of from one to four carbon atoms.

12. A compound of the formula

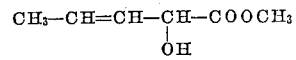

HERBERT GUDGEON.
ROWLAND HILL.